Figures 1, 2:
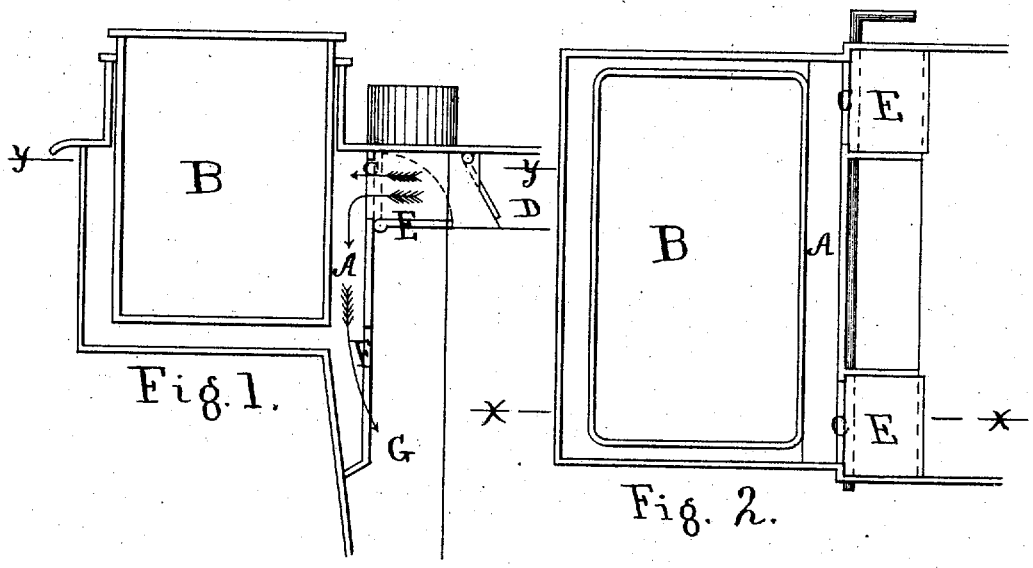

D. G. LITTLEFIELD.

Reservoir Cooking-Stove.

No. 8,913. Reissued Sept. 30, 1879.

Witnesses

A. C. Johnson

Inventor

Dennis G. Littlefield

N. PETERS, PHOTO-LITHOGRAPHER, WASHINGTON, D. C.

UNITED STATES PATENT OFFICE.

DENNIS G. LITTLEFIELD, OF ALBANY, NEW YORK.

IMPROVEMENT IN RESERVOIR COOKING-STOVES.

Specification forming part of Letters Patent No. 139,720, dated June 10, 1873; Reissue No. 8,913, dated September 30, 1879; application filed August 20, 1879.

*To all whom it may concern:*

Be it known that I, DENNIS G. LITTLEFIELD, of the city and county of Albany, and State of New York, have invented certain Improvements in Reservoir Cooking-Stoves, of which the following is a full and exact description, reference being had to the accompanying drawings, making a part of this specification, in which—

Figure 1 is a longitudinal section of the reservoir end of the stove at the line *x x*, and Fig. 2 a horizontal section of the same at the line *y y*.

My invention consists of an auxiliary chamber, constructed substantially as herein described, for receiving the reservoir, having openings formed therein, communicating with the descending flue or flues of the stove, and of such an arrangement of dampers as will cause the heated gases in their passage thereto to be thrown into the reservoir-chamber or excluded therefrom on their passage downwardly to heat the oven.

As shown in the drawings, A is the auxiliary chamber, formed by an extension of the body of the stove. The water-reservoir B is placed within said chamber A, leaving a space around it. C C are openings formed in the plate dividing the chamber A from the vertical flue or flues of the stove, whereby an open communication may be maintained between the flue D, over the top of the oven, and the chamber A. F F are openings near the base of chamber A, also formed in the plate dividing the chamber A from said vertical flues, for the purpose of permitting the exit of the gases and smoke from said chamber A to the said descending flue or flues. E E are dampers, so arranged that when they are placed in a vertical position, as indicated by the dotted lines in Fig. 1, they close the openings C C and prevent the flow of the highly-heated gases into the chamber A. This arrangement is of great importance while starting fire in the stove, at which times the slightly-heated gases and smoke, by coming in contact with the surface of a water-reservoir, will have the greater portion of their contained heat extracted, and consequently become so sluggish as to greatly retard their passage to the flues of the stove and to the chimney. After the fire begins to burn freely the dampers E E may be turned into the horizontal position shown in the drawings, thereby cutting off the direct communication with the downward flues of the stove, and throwing the highly-heated gases into the chamber A, where a sufficient quantity remains to effect the heating of the water contained in the reservoir B. The gases and smoke pass downward out of the chamber A, through the openings F into the descending flues G, and thence through flues under the oven for heating it, and finally out of the stove through the escape-pipe. After the water in the reservoir has become sufficiently heated, the dampers can be turned so as to close the openings C C and cut off the flow of the highly-heated gases into the chamber A, thereby stopping the unnecessary evaporation of the water and generation of steam, thus removing a frequent cause of annoyance to housekeepers.

As shown in the drawings, the chamber A is applied to the well-known form of three-flue stoves; but it can be adapted with equal facility to any arrangement of flues wherein the gases first pass downward from over the top of the oven to a descending flue or flues, to heat the oven.

It will be seen that with my improvement the stove can be used independently of the parts containing the reservoir B, and that by it I provide a means of controlling at will the admission of the highly-heated gases into the chamber A or their exclusion therefrom while using the stove for baking or for other purposes, thus economizing heat when hot water is not required.

I am aware that water-reservoirs have heretofore been placed in chambers of cooking-stoves, and that among the many of the well-known stoves of this class the patented ones of Davis and Lord, November 23, 1829, and Butts and Stevens, patented March 14, 1848, may be mentioned as showing such constructions; but the chamber A of my improved reservoir-stove differs from those of the above-named class of stoves in this, that it does not form any portion of the flues for heating the oven or for discharging the spent gases from the stove to the chimney, and has no enforced draft, whereby the heated gases are carried around or under the reservoir, but is dependent upon the heat received and retained in the reservoir-chamber A by carrying the currents out of said chamber in a descending direction, which leaves the most highly-heated gases remaining to impart their heat to the water contained in the reservoir B.

What I claim as my invention is—

The auxiliary chamber A, containing the reservoir B, combined with the descending flue or flues of a cooking-stove in such a manner as to discharge the smoke and gases from the lower part of said chamber A to the said descending flue or flues, and controlling the admission or exclusion of the highly-heated gases to and from said chamber A, substantially in the manner and for the purposes herein described.

DENNIS G. LITTLEFIELD.

Witnesses:

S. J. HAIGHT,

A. C. JOHNSON.